June 17, 1924.
M. A. MAYNARD
AUTOMOBILE SIGNAL
Filed March 13, 1923
1,498,467
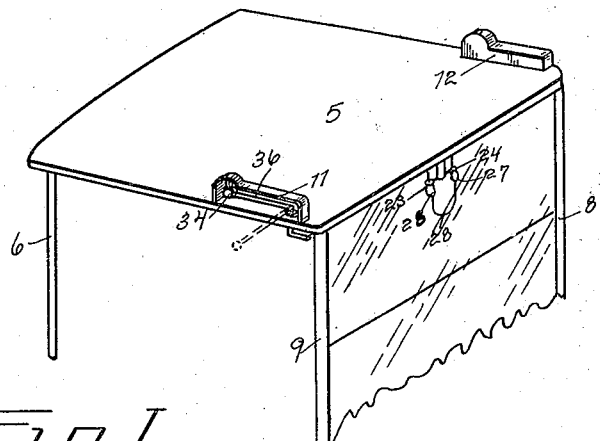
Fig. I
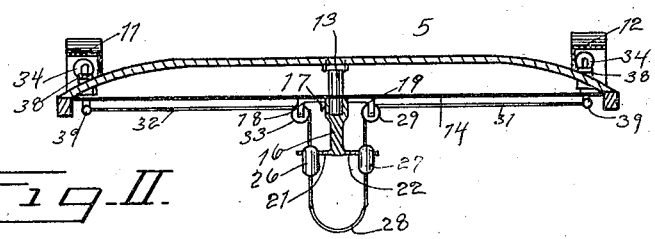
Fig. II
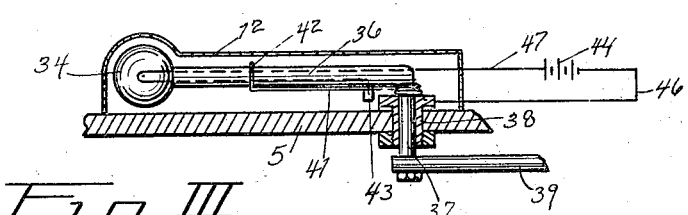
Fig. III
INVENTOR
MILTON A. MAYNARD
BY
Victor J. Evans
ATTORNEY Patented June 17, 1924.

1,498,467

UNITED STATES PATENT OFFICE.

MILTON A. MAYNARD, OF SUISUN, CALIFORNIA.

AUTOMOBILE SIGNAL.

Application filed March 13, 1923. Serial No. 624,800.

*To all whom it may concern:*

Be it known that I, MILTON ALLEN MAYNARD, a citizen of the United States, residing at Suisun, in the county of Solano and State of California, have invented new and useful Improvements in Automobile Signals, of which the following is a specification.

This invention relates to improvements in automobile signals.

The principal object of this invention is to provide a simple signal whereby the driver of the machine may signal his intentions to execute a turn or to stop.

Another object is to produce a device of this character which is simple in construction and therefore cheap to manufacture.

A still further object is to provide means whereby the signal may be automatically illuminated at night when the same is thrown to an operative position.

Other objects and advantages will be apparent during the course of the following description.

In the accompanying drawings forming a part of this specification, and in which like numerals are employed to designate like parts throughout the same, Figure 1 is a fragmentary detail perspective view showing my invention applied to the top of an automobile, Figure 2 is a cross section through the top of an automobile, showing my invention applied thereto, and Figure 3 is an enlarged detail view of the signal arm.

Various devices have been employed for the purpose of warning the driver of a vehicle either in front or in back as to the intentions of the preceding driver. These devices, however, have been complicated, unsightly and many times located at a height where they were dangerous to pedestrians.

Applicant has therefore provided a signal which overcomes these difficulties and by viewing Figure 1, it will be noted that the numeral 5 designates the top of an automobile, while the numeral 6 designates one of the bows and the numeral 7 designates the usual glass windshield, while the numerals 8 and 9 designate the uprights of the windshield frame.

Mounted upon the top 5 are housings 11 and 12. As the signal mounted in each of the housings is identical, but one will be described.

A post 13 is secured to the roof of the vehicle and extends downwardly through the usual lining fabric 14 and has secured thereto a casting 16. This casting is secured thereto by a thumb nut or set screw 17 and has formed thereon outwardly extending arms 18 and 19, while mounted directly below each of these arms is an outwardly extending rod as shown at 21 and 22, each of which terminates in a loop as best shown at 23 and 24 (see Fig. 1.)

These loops are each adapted to surround the upper portion of a handle as shown at 26 and 27. These handles are connected by a cord as shown at 28, while a cord 31 extends from the handle 27 over a pulley 29 pivoted in the arm 19. This cord 31 has its opposite end connected to the signal lever as will be later seen.

A similar cord 32 extends from the handle 26 over a pulley 33 and to the opposite signal as will be presently shown.

Referring to Figure 3, the numeral 34 designates a bulb connected to the end of a tubular arm 36. These bulbs may be red and green if desired. This arm extends downwardly as shown at 37 through a suitable bushing being secured in the top 5. A lever 39 is attached to the downwardly extending portion 38 in such a manner as to prevent rotation with respect thereto.

A spring 41 has one end connected to the bushing 38 and has the opposite end carried forward and bent around the arm 36 as shown at 42. The natural tendency of this spring is to maintain the arm 36 within the housing 11 at all times.

A lug 43 is formed upon the arm 36 and is adapted to contact a similar lug (not shown) formed upon the bushing 38.

A battery 44 has one side connected by a wire 46 to the bushing 38, while the opposite side of the battery is connected by a wire 47 to the lamp 48, the opposite side of which lamp is connected by a wire shown in dotted lines connected to the lug 43. The free end of the lever 39 is attached to the free end of the cord 32.

The operation of my device is as follows:—

Assuming that the driver wishes to make a right hand turn, the handle 26 is grasped and pulled downwardly. This pulls upon the lever 39 through the action of the cord 32 which swings the arm 36 outwardly as shown in dotted lines in Figure 1 against the tension of the spring 41. If he desires to make a left hand turn the action is similar with the exception that he grasps the handle 27. When he desires to come to a stop he grasps the cord 29 with the result that both signals are thrown outwardly indicating the stop.

During the daytime these signals are readily visible and in order that the same may be seen at night the closing of a suitable switch will cause the bulbs 34 to be lit when the lugs 43 move into contact with the lugs carried upon the bushings 38.

It will thus be seen that I have devised a very simple and efficient signal, one which will operate without undue effort upon the part of the driver and one which will be readily discernible both during the day and during the night.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, a housing mounted upon opposite sides of an automobile top and at a point above the plane of the top, a signal arm pivoted in each of said housings, a lever secured to each of said arms at a point beneath said top, a cord secured to each of said levers, a support secured to said top at a point midway between said arms and extending downwardly therefrom, a casting secured to said support, pulleys mounted on said casting and adapted to receive said cords, a handle secured to each of said cords, outwardly extending rods formed on said casting, said rods terminating in a loop and adapted to retain said handles when said signals are in inoperative position, and a cord secured to each of said handles, for the purpose specified.

In testimony whereof I affix my signature.

MILTON A. MAYNARD.